Figure 1:
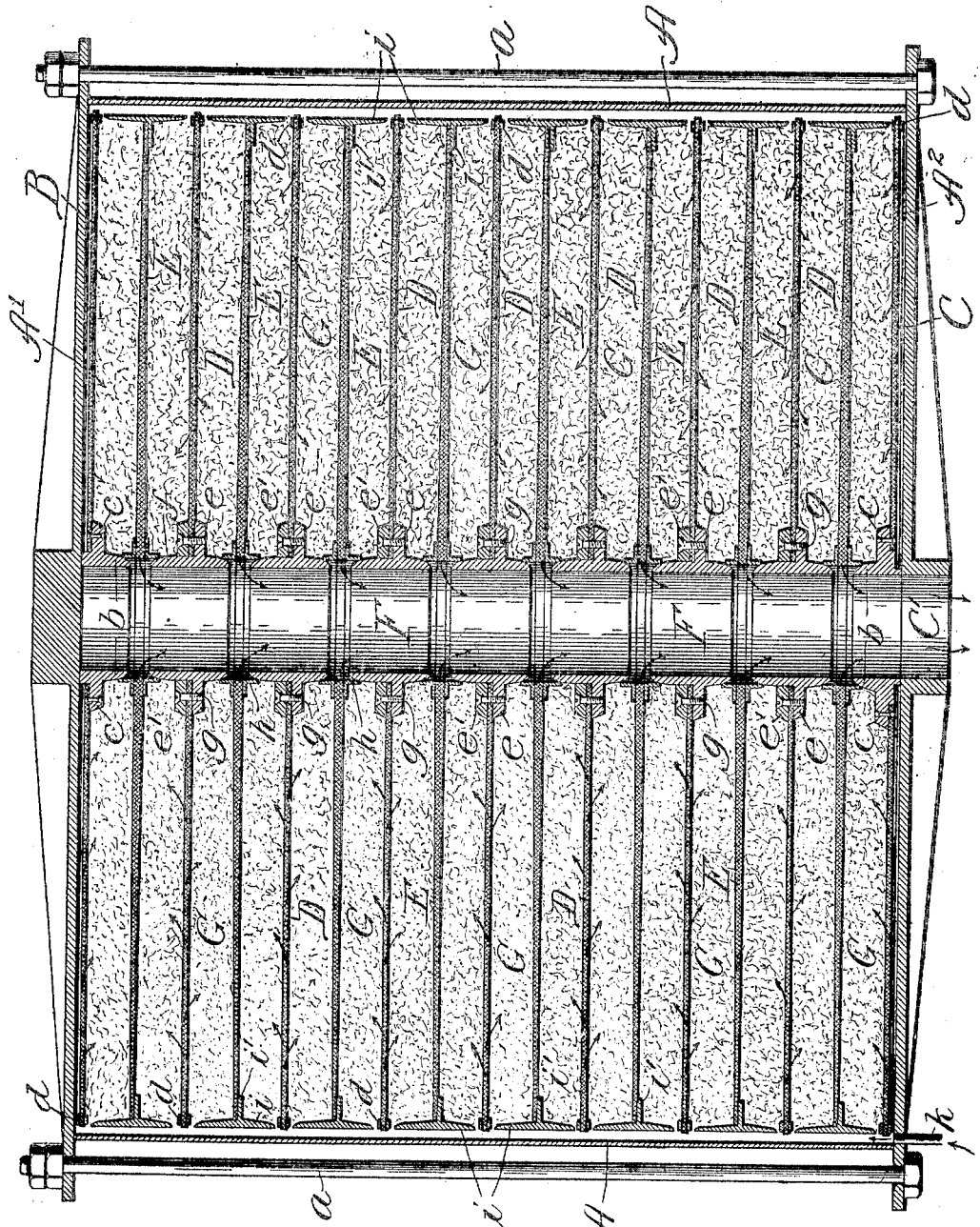

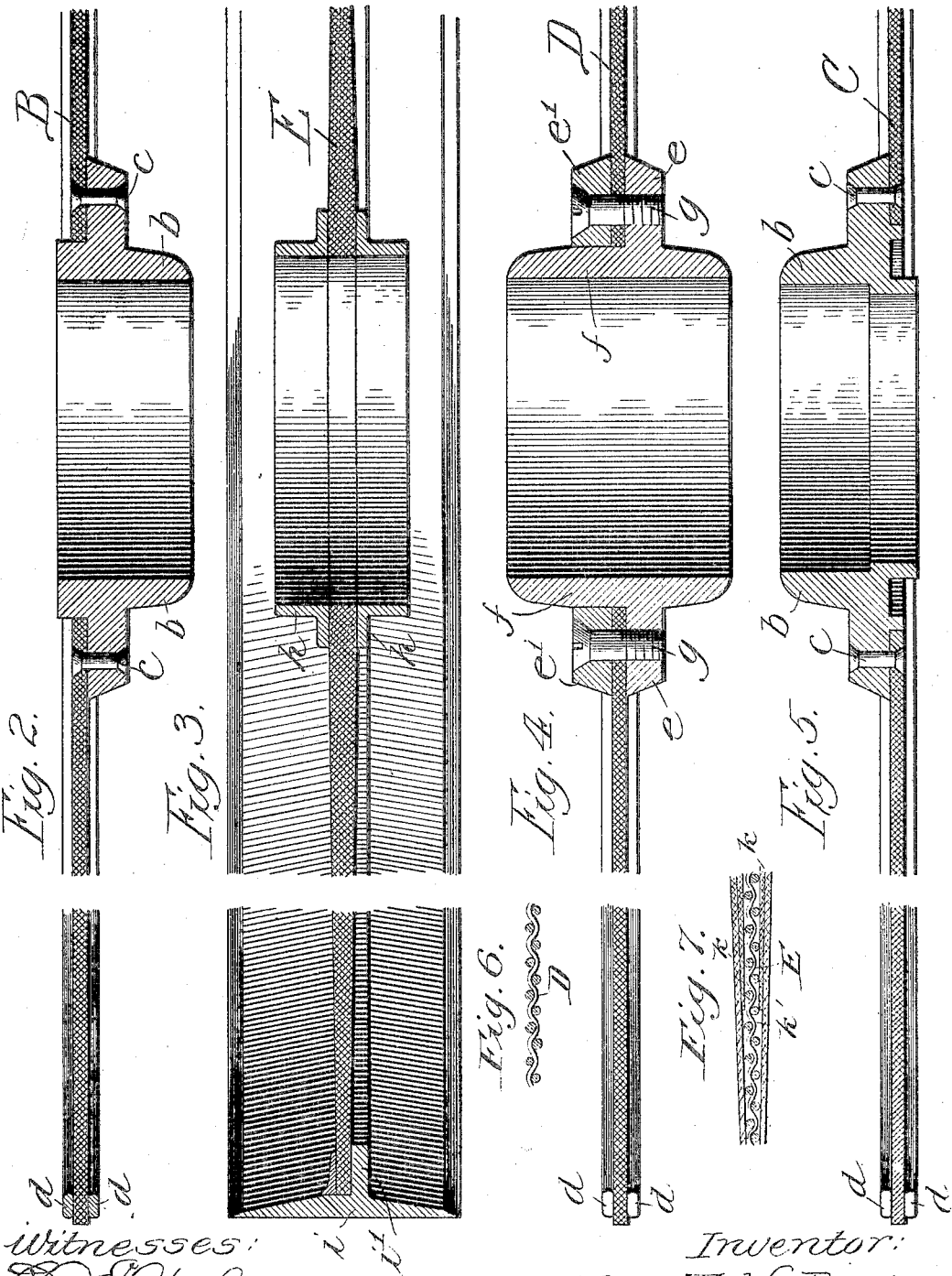

UNITED STATES PATENT OFFICE.

JOHN T. H. PAUL, OF NEWCASTLE, PENNSYLVANIA, ASSIGNOR TO E. GOLDMAN & COMPANY, OF CHICAGO, ILLINOIS, A CORPORATION OF ILLINOIS.

FILTER.

No. 797,819.      Specification of Letters Patent.      Patented Aug. 22, 1905.

Application filed November 25, 1904. Serial No. 234,186.

*To all whom it may concern:*

Be it known that I, JOHN T. H. PAUL, a citizen of the United States, residing at Newcastle, in the county of Lawrence and State of Pennsylvania, have invented a new and useful Improvement in Filters, of which the following is a specification.

My invention relates to an improvement in the class of filters more commonly used for filtering beer and involving as their generally-stated construction a series of circular screens, each formed, as usual, of a wire center between layers of filter-cloth and confined flatwise one over the other about a central discharge-duct, into which the filtered liquid is directed through the pulp or filtering mass confined between the screens about the central outlet.

My object is to provide a strong but simple and effective construction of filter in the class referred to; and to that end my invention consists in certain details of construction and combinations of parts, all as hereinafter described, and pointed out in the claims.

In the accompanying drawings, Figure 1 shows my improved filter by a view in vertical sectional elevation. Fig. 2 is a cross-section, on an enlarged scale, through the upper distributer-screen device, shown broken; Fig. 3, a similar view of an intermediate or inner collector-screen device; Fig. 4, a similar view of an intermediate or inner distributer-screen device; Fig. 5, a similar view of the lowermost screen device forming a distributer; Fig. 6, an enlarged broken sectional view of a distributer-screen, and Fig. 7 a similar view of a collector-screen.

Each of the screens employed is of disk shape and annular in the sense of having a central opening to fit, as to alternate screens, about circumferentially-flanged thimbles, to which they are secured, these alternate screens forming the distributers and alternating with similar collector-screens, with the centers of which the aforesaid thimbles aline in series to form the delivery-duct, the thimbles seating in annular flanged bearings, between pairs of which the collector-screens are confined about their open centers.

A is a drum-like metal casing having heads A' and A² secured on its opposite ends, as by connecting bolt-rods $a$ $a$, which confine the screens, hereinafter described, between the heads, the lower head being shown with a central flanged opening C' and the upper head being closed.

B and C denote, respectively, the uppermost and lowermost distributer-screens, shown of disk shape with a central opening in each, fitting about a flanged thimble $b$, to which it is securely fastened, as by rivets $c$, and the outer edge of each of these screens is confined for reinforcement between flat annular metal bands $d$.

D D denote the intermediate distributer-screens like the screens B and C with edge-confining reinforcing-bands $d$ and each fitting at its central opening about the flange $e$ of a thimble $f$. The thimbles $f$ for the intermediate screens D, of which any desired number may be provided, differ from the thimbles $b$ in having their circumferential flanges $e$ approximately midway between the thimble ends, which are rounded externally, as are the inner ends of the thimbles $b$, the better to adapt them to their seats, as hereinafter described, and the screens D are confined at their central openings between the flanges $e$ and annular metal bands $e'$, secured together, as by screws $g$, passing through them.

E E denote the collector-screens of the same disk shape as and alternating with the others, with the edge about the open center of each confined between a pair of angle-metal rings $h$ of L shape in cross-section. The thimbles $b$ and $f$ seat at their rounded edges in the rings $h$, with which they form the central discharge-duct F of the filter. The screens E are confined about their outer edges upon the annular metal flanges $i'$, extending centrally about the inner sides of metal rings $i$, forming with the bands $d$ confining walls about the spaces between screens for the filter-mass or pulp G in those spaces. The closure between these spaces and the duct F, afforded by thimbles and their seating-flanges, and that about the outer circumference of the spaces, afforded by the flanged rings $i$ and bands $d$, effectually confine the filter-mass against being dislodged from its position in the spaces between the screens.

The screens E, I prefer to use in my improved filter are of the construction represented in Fig. 7, each comprising a wire-mesh center $k'$ between layers $k$ of fine twill-cloth. As shown in said figure, the twill-cloth is provided in two outer diametrically wider layers and two inner narrower but otherwise similar layers, thereby thickening the screen toward its center for the purpose of increasing the width of bearing for the thimble $f$, although this feature of the construction is not of importance. Each screen D is preferably of the construction represented in Fig. 6, which shows a single thickness of wire-mesh for the annular disk.

With the parts of the filter assembled into the condition represented in Fig. 1 beer to be filtered is introduced against counter-pressure in the usual way, preferably from below through a nozzle $k$ into the space between the shell A and the screen edges exposed to that space. Thus the liquid that enters at the exposed edge of each screen B, C, and D is distributed by such screen through the filter-masses immediately on both sides thereof, as indicated by arrows, for which reason those screens are properly termed, for distinguishing them, the "distributers," and the only access which the liquid after filtration has to the duct F is by way of the screens E, which lead into the duct while the distributer-screens abut about their central openings against the duct-forming thimbles, and it is because of this attribute of the screens E of collecting the filtered liquid into the discharge-duct that they are properly termed the "collectors." The filtered liquid thus collected into the duct F discharges therefrom at the outlet C'.

What I claim as new, and desire to secure by Letters Patent, is—

1. In a filter, the combination of a shell having heads secured on its opposite ends, a series of annular screens confined in said shell between the heads and forming spaces between them, filter-mass in said spaces, a discharge-duct leading through said screen series to an outlet at one end of the duct, said duct comprising alining thimbles about which alternate screens are secured at their openings to form the distributers, and rings, in which said thimbles are seated, between pairs of which screens alternating with said distributers are confined about their openings and form the collectors leading to said duct, wall-forming rings about alternate screens, having flanges to which said screens are fastened about their outer edges, and forming with the shell a space for receiving the liquid to be filtered, and an inlet leading to said space, substantially as described.

2. In a filter, the combination of a shell having heads secured on its opposite ends, a series of annular screens confined in said shell between the heads and forming spaces between them, filter-mass in said spaces, a discharge-duct leading through said screen series to an outlet at one end of the duct, said duct comprising alining flanged thimbles, upon the flanges of which alternate screens are fastened at their openings to form the distributers, and angle-metal rings, in which said thimbles are seated, between pairs of which screens alternating with said distributers are confined about their openings and form the collectors leading to said duct, wall-forming rings about alternate screens, having flanges to which said screens are fastened about their outer edges and forming with said shell a space for receiving the liquid to be filtered, and an inlet leading to said space, substantially as described.

3. A filter comprising, in combination, a shell having heads secured on its opposite ends, a series of annular screens confined in said shell between the heads and forming spaces between them, filter-mass in said spaces, a discharge-duct leading through said screen series to an outlet in one head and formed of alining flanged thimbles rounded toward their edges, upon the flanges of which alternate screens are fastened at their openings to form the distributers, rings on the flanges of intermediate said thimbles confining the screens thereon, and angle-metal rings in which said thimbles are seated, between pairs of which screens alternating with said distributers are confined about their openings and form the collectors leading to said duct, wall-forming rings about the collector-screens, having flanges to which said collector-screens are fastened about their outer edges, and forming with the shell a space for receiving the liquid to be filtered, reinforcing-bands about the outer edges of the distributer-screens, and an inlet leading to said receiving-space, substantially as described.

JOHN T. H. PAUL.

In presence of—
M. S. MACKENZIE,
W. B. DAVIES.